April 20, 1926.
H. M. ROBERTSON
1,581,519
APPARATUS FOR AND PROCESS OF TREATING FOOD PRODUCTS
Filed Sept. 25, 1923
4 Sheets-Sheet 4
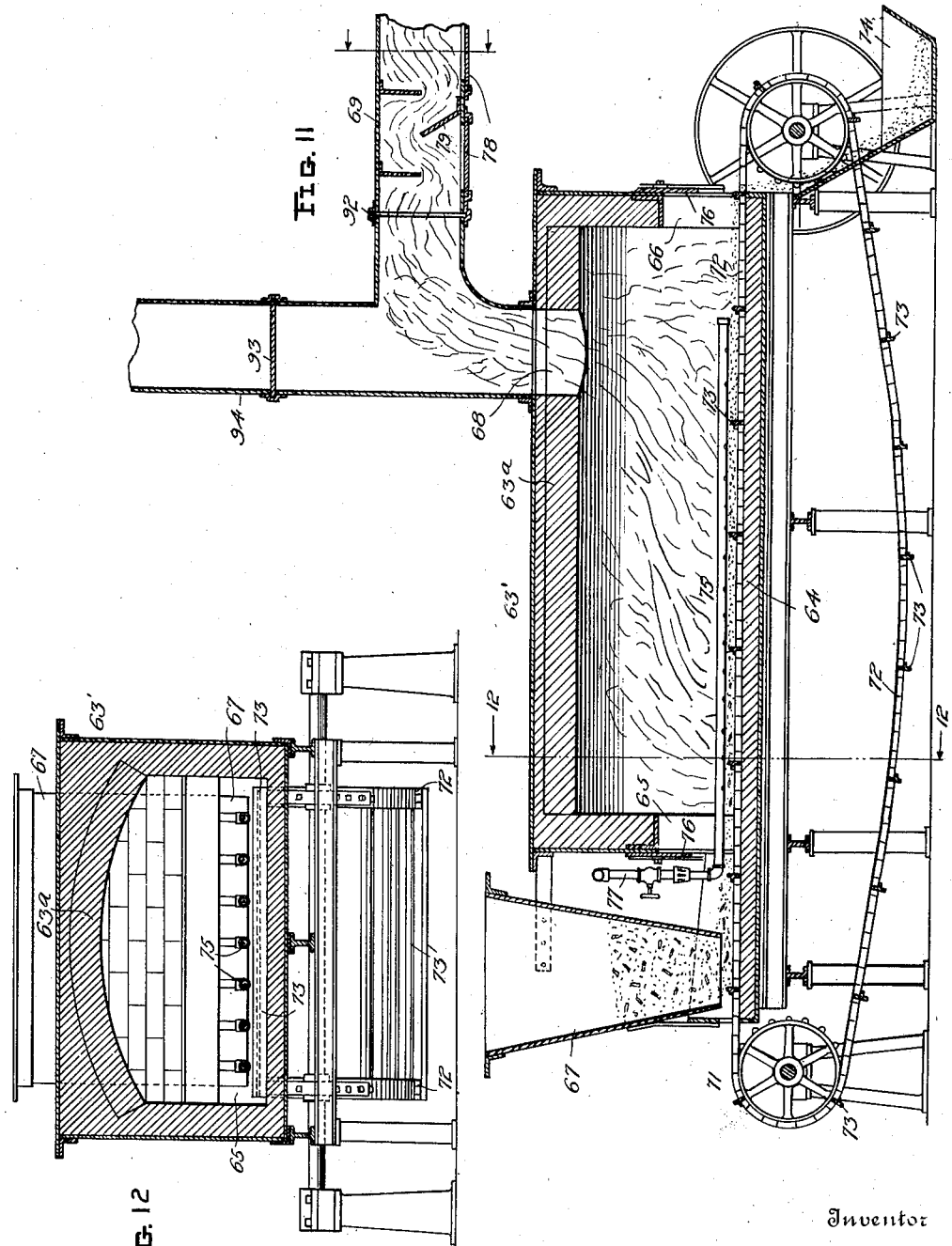
Inventor
Harry M. Robertson
By Geo. A. Pitts
Attorney Patented Apr. 20, 1926.

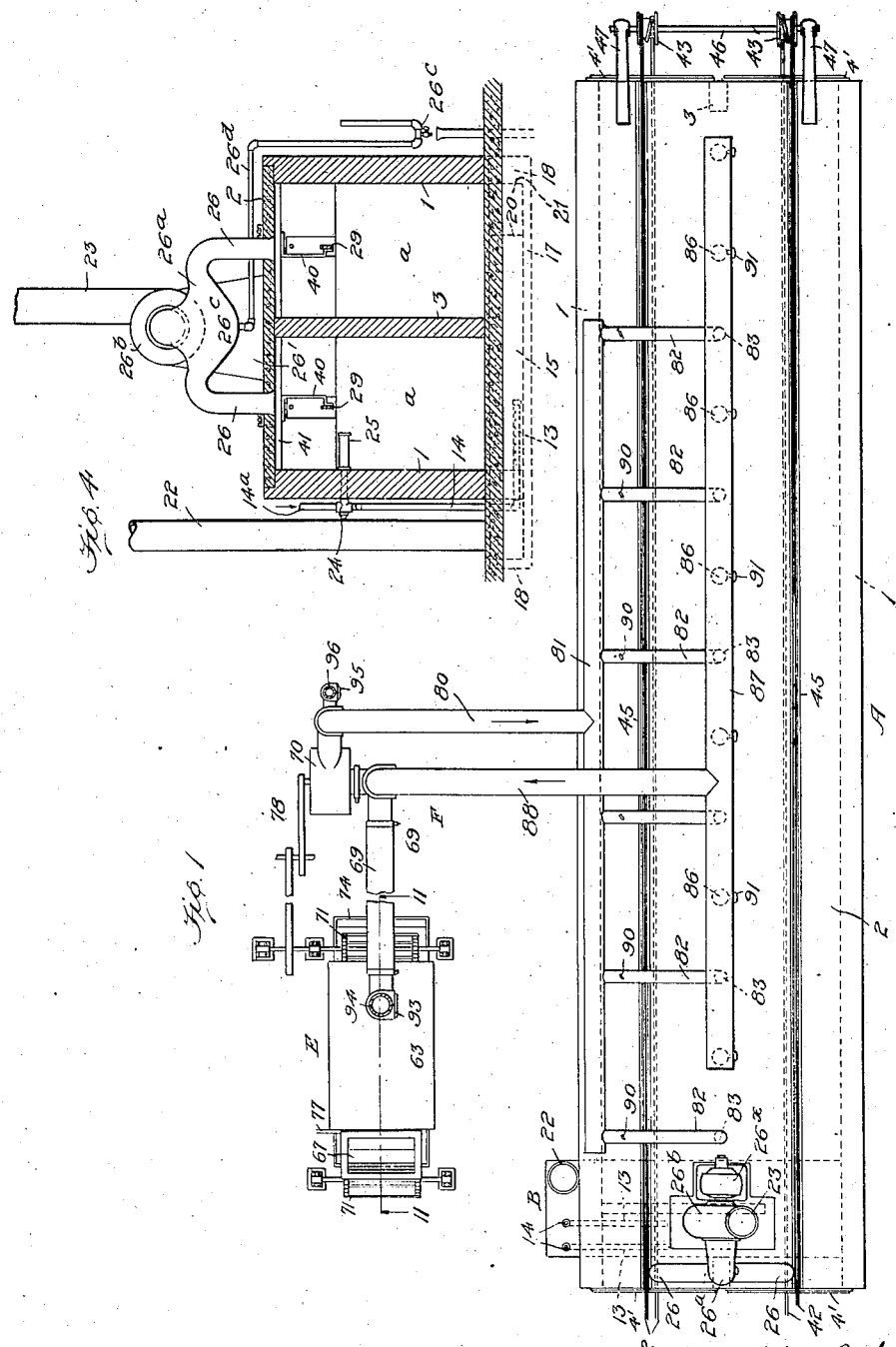

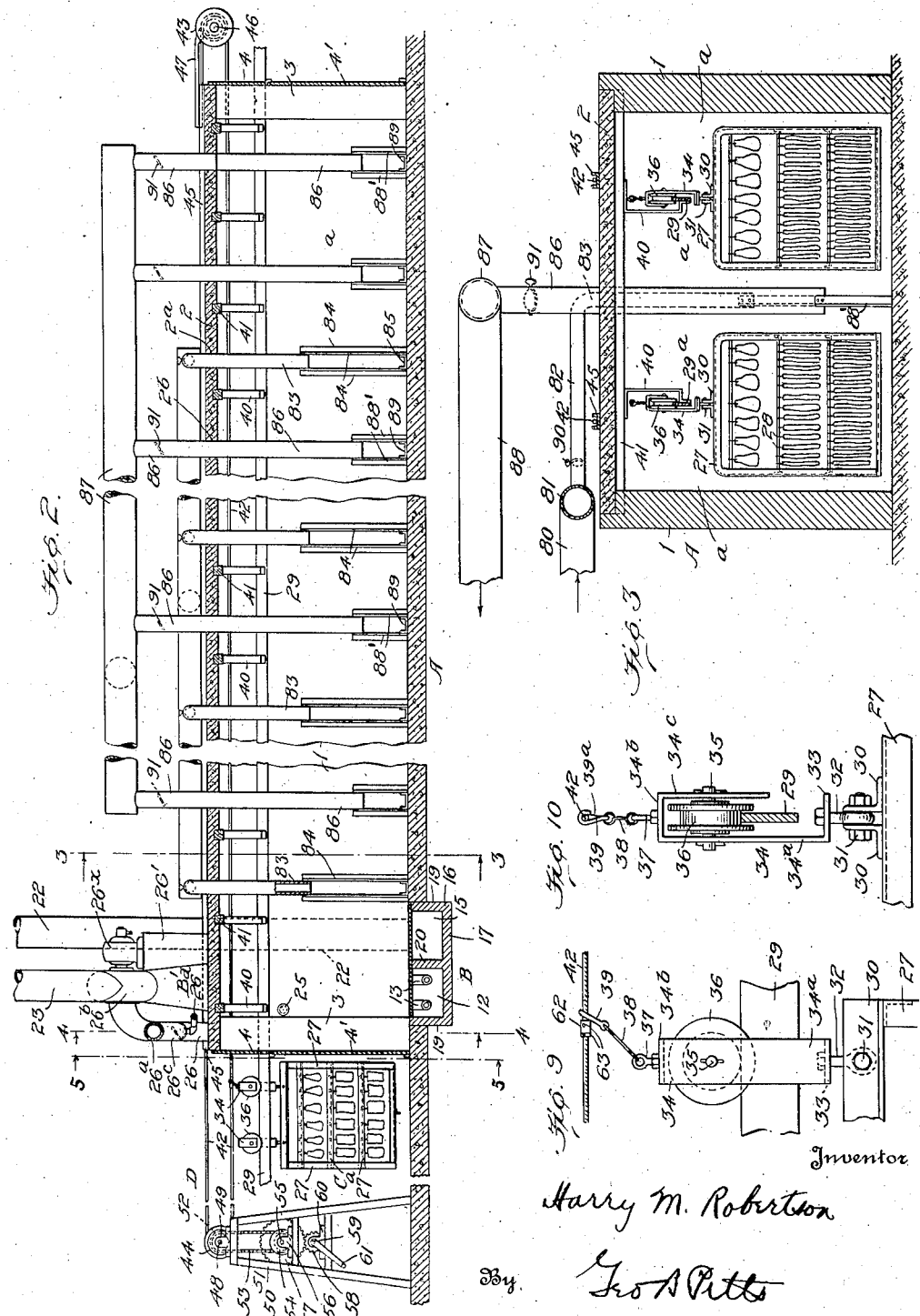

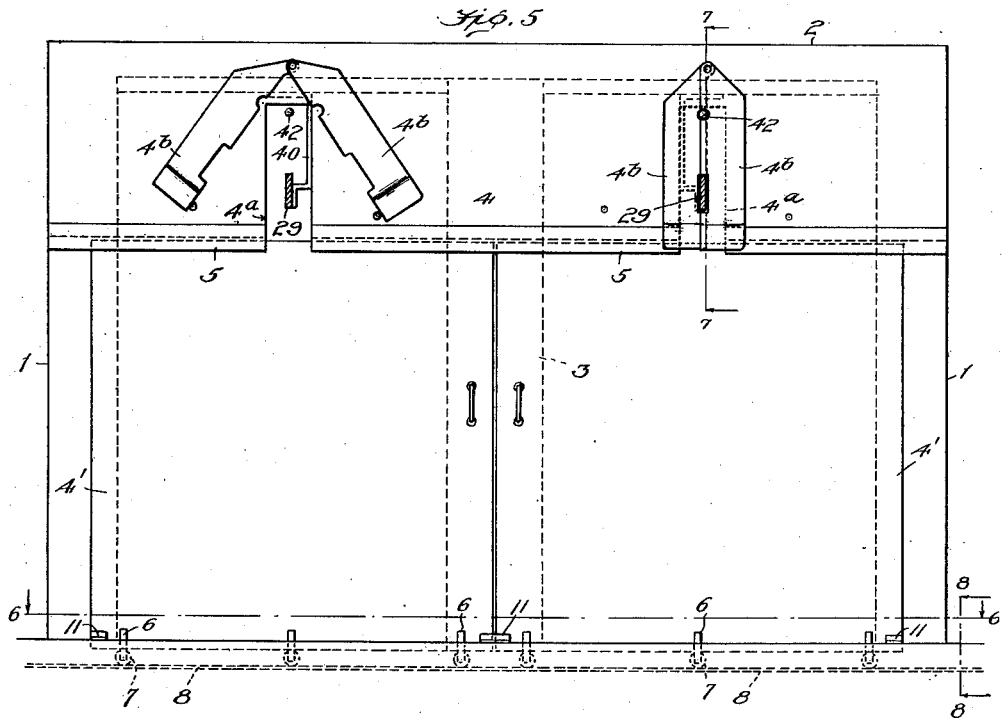
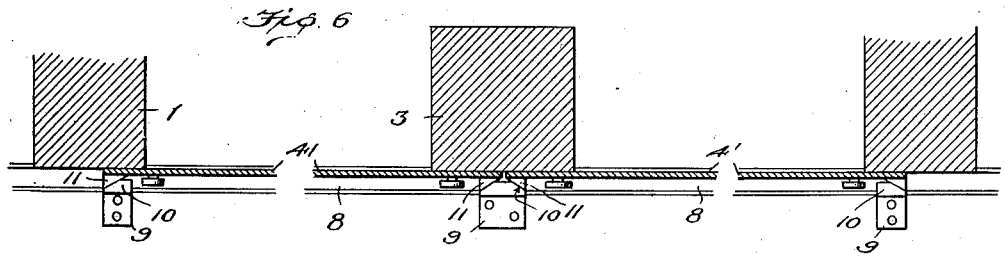
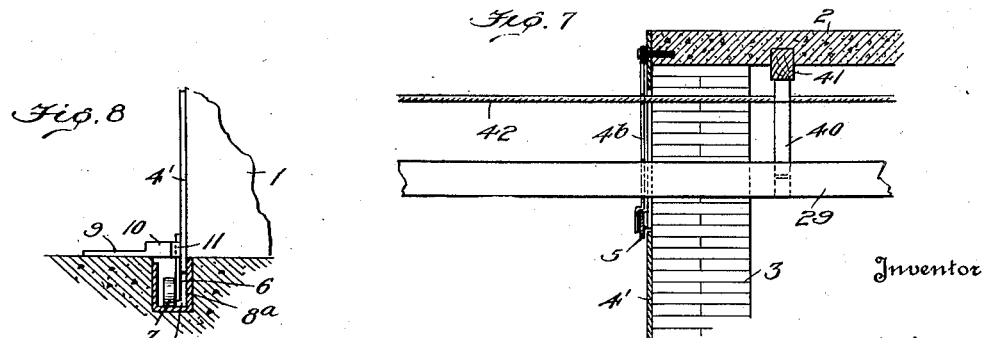

1,581,519

UNITED STATES PATENT OFFICE.

HARRY M. ROBERTSON, OF LAKEWOOD, OHIO.

APPARATUS FOR AND PROCESS OF TREATING FOOD PRODUCTS.

Application filed September 25, 1923. Serial No. 664,711.

*To all whom it may concern:*

Be it known that I, HARRY M. ROBERTSON, a citizen of the United States, residing at Lakewood, in the county of Cuyahoga and State of Ohio, have invented certain new and useful Improvements in and Relating to Apparatus for and Processes of Treating Food Products, of which the following is a specification.

This invention relates to an apparatus for and process of treating or curing food products including meats, fish and other foods, more particularly an apparatus and process in which food or food products are subjected to heat and smoke to cure them.

One object of the invention is to construct a food treating apparatus in which the food may be uniformly treated.

Another object of the invention is to provide an improved apparatus constructed to receive batches of food and to successively treat them, whereby the apparatus may operate continuously for an indefinite period.

A further object of the invention is to construct an improved apparatus for smoking foods wherein are provided zones of varying smoke densities and means for moving the food to be smoked therethrough to effect curing.

Another object of the invention is to provide an improved food smoking apparatus in which separate means are provided for heating the smoking chamber and for supplying smoke thereto, thereby enabling the apparatus to be operated at any desired temperature with minimum shrinkage in the food and the smoke clarified of soot, ashes or bits of unconsumed smoke producing material.

Another object of the invention is to provide an apparatus for smoking foods in which batches thereof may be successively smoked and the smoke caused to circulate to and from the smoking chamber, whereby it may be repeatedly used as long as the apparatus continues in operation.

Another object of the invention is to construct an apparatus for curing foods by subjecting them to heat and smoke in an improved manner, whereby the heat and smoke may be properly controlled to insure a uniform treatment and color at all times.

Another object of the invention is to provide an improved process of curing foods or food products to insure uniform and complete curing.

A further object of the invention is to provide an improved process of treating food products by subjecting them first to heat and them to smoke, whereby proper treatment of the products is effected with minimum shrinkage in their weight.

Other objects of the invention will be apparent to those skilled in the art to which my invention relates from the following description taken in connection with the accompanying drawings, wherein Fig. 1 is a top plan view of an apparatus embodying my invention (part of the carrier propelling means being omitted).

Fig. 2 is a longitudinal section through the smoking tunnel.

Fig. 3 is a transverse section on the line 3—3 of Fig. 2, with two loaded carriers shown in the tunnel.

Fig. 4 is a transverse section on the line 4—4 of Fig. 2.

Fig. 5 is a section on the line 5—5 of Fig. 2.

Fig. 6 is a section on the line 6—6 of Fig. 5.

Fig. 7 is a fragmentary view on the line 7—7 of Fig. 5.

Fig. 8 is a fragmentary section on the line 8—8 of Fig. 5.

Fig. 9 is a fragmentary elevational view of the conveying means and the attaching device showing in detail the preferred manner of connecting the carrier to the conveying means.

Fig. 10 is an end view of the elements shown in Fig. 9.

Fig. 11 is a section on the line 11—11 of Fig. 1.

Fig. 12 is a section on the line 12—12 of Fig. 11.

In the drawings, A indicates as an entirety a relatively long chamber or tunnel through which carriers or sets of carriers, each carrying a batch or charge of food, are successively moved to permit the food to be treated or cured; B indicates as an entirety means for heating the chamber or tunnel A; C indicates as an entirety a carrier for holding a batch or charge of food, for example, ham, bacon or fish; D indicates as an entirety the means for conveying or moving the filled carriers through the heating and smoking chamber or tunnel; E indicates as an entirety an apparatus for producing smoke; and F indicates as an entirety a circulating system for the smoke, whereby it is generated and supplied or circulated to and from the tunnel A.

The smoking chamber or tunnel A comprises side walls 1 and a roof 2 that may be of any desired construction. In the preferred form, the side walls 1 are constructed of brick and the roof 2 of reinforced concrete, but it will be understood that the particular materials used and manner of constructing the tunnel forms no part of the present invention. The tunnel A is of sufficient length so that a plurality of batches or charges of foods may be treated simultaneously and moved step by step through the tunnel and successively subjected to heat and smoke, or smoke zones. In the preferred form of construction and for the purpose of carrying out my improved treating process, the tunnel A is of a length to provide a plurality of zones of varying smoke densities, to insure proper treatment or curing of the food products. To insure efficient and economical operation, I prefer to make the tunnel wide enough to simultaneously receive a pair of carriers side by side and to move them through the tunnel in such relationship, since this arrangement permits the delivery of the smoke to and its exhaust from a point or points centrally of or between a pair or pairs of carriers and therefore equal treatment of a plurality of batches of food from a single set of smoke inlets and exhausts. By this arrangement I provide treating spaces $a$, $a$, at either side of the inlets and exhausts as will later appear.

At the opposite ends of the tunnel, a pair of upright members 3, preferably constructed of brick, are provided to form engaging walls for end plates 4 and suitable doors 4', whereby the latter, when closed, may seal the tunnel in a ready manner. By this arrangement, a pair of doors 4' may be provided at each end of the tunnel and each pair may be simultaneously moved to open or close both sides $a$ of the tunnel A. The doors 4' are preferably arranged to slide laterally away from each other, their upper edges being guided by overlapping plates 5, preferably secured to the lower ends of the end plates 4. The lower edges of the doors 4' are provided with depending brackets 6 having stud shafts on which are mounted rollers 7. The rollers 7 engage a track 8 and permit the doors to be readily moved in either direction. To insure sealing of the tunnel A, each track is formed of a U-shaped section of metal and countersunk in the floor (see Fig. 8) and its inner upstanding wall $8^a$ is disposed in the plane of the ends or end surfaces of the walls 1 and front face of the adjacent upright member 3 so that the lower edges of the doors may extend below the free edge of the upstanding wall $8^a$. 9 indicates a plurality of blocks secured to the floor and having pairs of inclines 10, one pair for each door 4'. 11 indicates a pair of inclines carried by each door and positioned thereon to engage the adjacent pair of inclines 10. As will be evident from Fig. 6, the inclines 11 on each door and the adjacent inclines 10 are so arranged that they will come into engagement in the closing movement of the door, so that as the latter approaches its closed position it is forced inwardly against the walls 1, 3 and $8^a$ to seal the tunnel.

In the disclosed embodiment of my invention, the tunnel is supplied with smoke produced by a furnace or smoke producing apparatus E (already referred to), which is separate from the smoke tunnel or treating chamber, and the latter or a portion thereof is heated by means independent of the smoke producing apparatus. The heating means B is preferably arranged near or adjacent the inlet end of the tunnel A, so that the food may be subjected to the heat immediately upon being moved into the tunnel and thus brought to the desired temperature at the beginning of the smoking step or steps to be later referred to. The portion of the tunnel A which is heated by the heating means may be termed the heat zone. The heating means B may be of any desired form or kind and incorporated in the tunnel structure in any desired manner; but for illustrative purposes, I have shown a fire chamber 12 in which project suitable burners 13 for burning gas or liquid fuel, supplied by valve controlled pipes 14. 15 indicates a flue connected to the fire chamber 12. In the preferred form of construction the fire chamber 12 and flue 15 are formed by a structure 16 disposed below the floor surface of the tunnel A and extending transversely thereof. The structure 16 comprises a bottom wall 17, end walls 18, and side walls 19 and an intermediate wall 20 forming with the side walls, the fire chamber 12 and flue 15. The fire chamber and flue are connected by an opening 21 (see Fig. 4), so that the flame, products of combustion and resulting heat traverse the tunnel transversely substantially twice and are exhausted at one end into an exhaust pipe or chimney 22. The supply pipes 14 are connected to a main supply pipe $14^a$, which in turn is provided with a valve 24. The valve 24 is preferably connected with and operated by a thermostat 25, of suitable construction and extending into the chamber or tunnel A in position to be affected by the temperature therein to open and close the valve 24, so that the burner 13 may supply more or less heat to maintain the temperature within the tunnel substantially constant. The valve 24, the thermostat 25, and connections therebetween, may be of any desirable construction, for example, similar to like elements shown and described in U. S. Letters Patent No. 1,367,935, granted on the 8th day of February, 1921, to Carl M. Yoder.

B' indicates a suction means connected with the tunnel A, preferably in the upper portion of the heat zone, already referred to. The purpose of the suction means B' is to create a vacuum in the heat zone so as to effect a withdrawal of the heat therefrom to prevent it radiating throughout the remaining portion of the tunnel, the object being to subject the food products to the necessary temperature for proper curing or treatment prior to the smoking step or steps and to carry on the latter steps without the application of heat, so that minimum shrinkage in the weight of the products results. In the arrangement shown, the food products are subjected to the desired degree of temperature at the beginning of the process and prior to their being subjected to smoke. This permits me to regulate and control the heat and smoke, each independently of the other and to insure uniform treatment of the food products at all times.

The suction means B' preferably comprises a pair of pipes 26 leading through the roof 2 centrally of the two treating spaces $a$ in the tunnel (see Fig. 4) and connected to a common conduit $26^a$. The conduit leads into a suction fan $26^b$, the exhaust end of which is connected to the chimney 23. The conduit $26^a$ and inner ends of the pipes 26 are shaped to form a basin $26^c$, in which the condensed vapors resulting from the heating of the food products in the heat zone, may collect. The lower end of the basin $26^c$ has connected to it a discharge pipe $26^d$. The outer end of the pipe $26^d$ is provided with a U to form a liquid seal. At $26^e$, the U is provided with a valve to permit of the discharge of the condensed ingredients, at will. 26' indicates a support mounted on the roof 2 and serving as a base for the fan $26^b$ and a motor $26^x$. The motor $26^x$ is preferably directly connected to the shaft of the fan for driving it.

The carriers C for the batches of food may be constructed in any desired manner, but are preferably of cage-like construction to freely admit the heat and smoke to the exposed surfaces of the food products. In the illustrated form of construction, each carrier is formed of angle bars 27 bent into inverted U-shape and a plurality of parallel angle bars $27^a$, which connect the bars 27 in spaced, parallel relation and also constitute rods from which the food products are suspended in tiers or rows, as shown in Figs. 2 and 3, by suitable hooks or equivalent devices 28. The carriers C are mounted on wheels so that they can be moved into and through the tunnel A and finally removed therefrom. The wheels for each carrier are disposed above the carrier frame, so that they may engage a single track 29, which forms one element of the conveying means D, and be suspended therefrom. In utilizing this form of construction, I provide each carrier C with a pair of angle bars 30, connected at their opposite ends to the horizontal sections of the U bars 27. The upstanding walls of the bars 30 are formed with aligned openings in which are supported bolts 31, extending through the loops of eye bolts 32 connected to the flange 33 of a trolley 34. The trolley 34 comprises a main section $34^a$, a horizontal section $34^b$ and a supplemental section $34^c$, said sections and the flange 33 being preferably bent from a single piece of bar metal and the main and supplemental sections being parallel and formed with aligned openings to receive and support the opposite ends of a shaft 35, on which the supporting wheel 36 rotates. As shown in Fig. 2, I prefer to provide each carrier C with two trolleys, disposed in the central vertical plane thereof. 37 indicates an eye bolt rigidly connected to the horizontal section $34^b$ of the forward trolley, preferably in the plane of the adjacent wheel 36. 38 indicates a connection, for example, a link, pivoted at one end to the eye of the eye-bolt 37. The other end of the connection or link 38 is provided with an attaching device 39, which is adapted to be connected with the movable element of the conveying means D, so that the carrier may be moved in and through the tunnel A. The attaching device 39 preferably comprises a hook having a spring operated element $39^a$ which permits the device to be connected to the movable element and detached therefrom in a ready and quick manner.

Each track 29 is preferably supported within the tunnel A by depending brackets 40 secured in any desired manner to cross beams 41, which may be embedded in the roof 2 and also supported at their opposite ends in the side walls 1. The tracks 29 outside of the tunnel curve laterally, and extend to convenient points to permit loading and unloading of the carriers C.

The movable elements of the conveying means D may consist of endless cables 42, each running around suitable sheaves 43, 44, one of which is driven. The sheaves 43, 44 are supported beyond the ends of the tunnel in position so that the lower runs of the cables will extend through the tunnel above, but in vertical planes coinciding with the tracks 29 and the upper run will be along the roof 2, for which purpose I provide troughs 45—see Figs. 2 and 3. The sheaves 43 are mounted on a shaft 46 which is supported by a plurality of brackets 47. The sheaves 44 are connected to a shaft 48, mounted in hangers 49 (only one being shown—see Fig. 2). The hangers 49 are supported in a frame 50, housing a driving mechanism 51. Of the driving mechanism 51, 52 indicates a sprocket wheel fixed to the shaft 48. 53 indicates a sprocket chain running over the sprocket wheel 52 and a sprocket wheel 54 fixed to a counter shaft 55. The shaft 55 is supported in suitable hangers 56, carried by the frame 50. 57 indicates a gear fixed to the shaft 55 and meshing with a pinion 58. The pinion 58 is fixed to a shaft 59, preferably supported in bearings 60 carried by the frame 50. One end of the shaft 59 is extended and is provided with a crank 61, whereby the shaft 59 may be turned by hand, but it will be understood that the shaft 59 may be driven by suitable power, if desired, and in connection with the driving means a timing device and mechanism may be provided to move the cables 42 intermittently a predetermined distance at each operation so as to feed the carriers C step by step through the tunnel A. 62 indicates a plurality of moving devices carried by the cables 42 and uniformly spaced thereon. The moving devices 62 constitute abutments with which the attaching devices 39 engage, so that the cables 42, acting through the devices 62, 39 and connections 38, may move the trolleys on the tracks 29. Each of the moving devices 62 preferably comprises a pair of plates shaped to receive the cable between them and be clamped thereto by screws or bolts 63—see Fig. 9. As shown in Fig. 5, the end plates 4 at each end of the tunnel are formed with openings 4ª through which the tracks 29 and cables 42 extend, and these openings are adapted to be closed by pairs of doors 4ᵇ, which may be pivoted on the plates to permit them to be separated (see left side of Fig. 5) when the carriers are moved into or out of the tunnel.

In the preferred operation of the apparatus, one pair of carriers is disposed in the heating zone and each smoking zone from end to end of the tunnel A and at predetermined intervals, by means of the cables 42, the several pairs of carriers are simultaneously moved forward to the succeeding zones, respectively, so that the pair of carriers at the exit end of the tunnel is removed from such end and a pair of carriers is introduced into the tunnel to receive the first treating step. To effect this operation, the moving devices 62 are spaced apart a distance equal to the distance between corresponding points in adjoining zones; altho it will be apparent that where the length of the zones permit, sets of pairs of carriers may be treated in each thereof and said sets moved in the manner just referred to, in which event the spacing of the moving device will be changed to permit of this latter operation.

Of the smoke producing apparatus E, 63′ indicates a furnace or fire chamber having a bed 64, an inlet opening 65, and an outlet opening 66. 67 indicates a hopper to receive the smoke producing material, such as sawdust or corn-cobs or a mixture thereof. 68 indicates a smoke outlet preferably formed in the dome or roof 63ª of the chamber and having connected to it a conduit 69, which leads to the intake of a suitable fan or blower 70, which is interposed in and forms a part of the smoke circulating system F. The walls of the furnace 63 and bed 64 are formed of suitable fire resisting material. 71 indicates means for conveying or moving the smoke producing material through the furnace or fire chamber 63′. The conveying means preferably comprises a pair of endless chains 72 and spaced cross bars 73 between them which move over the bed and through the inlet and outlet openings 65, 66. As shown, the bars 73 engage the material flowing from the discharge opening of the hopper 67 and move it along the bed, finally discharging the ashes or unconsumed material through the opening 66 at the far end of the bed into a suitable receiver 74. 75 indicates means within the furnace or fire chamber for heating the smoke producing material as it is moved along the bed 64 to cause a partial combustion thereof to produce smoke which is drawn out through the outlet 68 and conduit section 69 by the fan 70 and forced by the latter to the tunnel A. The heating means 75 is so arranged and the supply of air, by adjustment of doors 76 for the openings 65, 66, is so controlled that active combustion of the material is prevented. The heating means 75 for the fire chamber preferably comprise a plurality of burners for gas or liquid fuel, which is supplied by the valved controlled pipes 77. 78 indicates suitable means for driving the conveying means 71 and fan 70. 79 indicates as an entirety devices for cleaning the smoke generated in the furnace E of ashes, bits of unconsumed smoke producing material and other solid materials which may be drawn out of the furnace with the smoke. The cleaning devices 79 are preferably arranged in the conduit section 69 between the outlet 68 and the fan 70. These devices comprise a plurality of spaced plates extending from opposite inner sides of the conduit section 69 and alternately arranged to provide a circuitous passage so that the ashes and the other heavy materials will be arrested and drop on to the bottom of the conduit, from which such materials can be removed through doors 78. The furnace or fire chamber for producing smoke and the smoke cleaning devices form the subject-matter of a separate application filed by me on the 10th day of July, 1923, Serial No. 650,727, to which reference may be made for a fuller description of the furnace and the means for cleaning the smoke of ashes and the like.

Of the smoke circulating means F, 80 indicates a supply pipe leading from the outlet or discharge opening in the casing of the fan 70 to a pipe 81 extending longitudinally of the tunnel A. The connection of the pipe 80 is substantially midway of the ends of the pipe 81 to insure a substantially uniform supply of smoke from end to end of the latter pipe. 82 indicates a plurality of branch pipes leading from the pipe 81 and extending into the tunnel A at uniformly spaced points to discharge the smoke therein. The pipe 81 may be arranged along and adjacent to the roof 2 and the pipes 82 preferably extend laterally to the center of the roof 2 and then they are bent downwardly to form vertical sections 83, which extend through suitable openings 2ª formed in the roof 2, all of the depending pipe sections 83 being in alignment in the central longitudinal plane of the tunnel A. The discharge ends of the supply pipe sections 83 terminate at a point above the floor of the tunnel and may be supported on the latter by pairs of angle plates 84, each pair being preferably braced and secured to the floor by U-shaped devices 85. 86 indicates a plurality of smoke exhaust pipes leading from the tunnel A and preferably extending through openings 2ᵇ formed in the roof 2 and connected to a return conduit or pipe 87. The pipe 87 is connected to a pipe 88, which in turn is connected to the conduit 69, so that the fan 70 may create a vacuum in the pipes 87, 88, and to thereby exhaust the smoke from the tunnel A. The return or discharge pipe 87 extends substantially from end to end of the tunnel A and the connection of the pipe 88 therewith is substantially midway between its ends. The inlet ends of the exhaust pipes 86 are preferably uniformly spaced from end to end of the tunnel A and are arranged in alignment and alternate with the discharge ends of the supply pipes 83. The pipes 86 preferably terminate in a plane below the discharge or free ends of the supply pipes 83. The free ends of the pipes 86 may be supported by pairs of angle plates 88', each pair being secured to the floor by U-shaped devices 89. By arranging the inlet and exhaust pipes 83, 86, in alignment in the central longitudinal plane of the tunnel A, an equal amount of smoke is supplied in a simple manner to both treating spaces a and the vacuum creating means 70 has equal effect on the smoke therein, so that the food products in the pairs of carriers are treated in the same manner from end to end of the tunnel. 90 indicates a valve arranged in each of the branch pipes 82. 91 indicates a valve arranged in each of the exhaust pipes 86. Each of the valves 90, 91, may be of the butterfly type. All of the valves for each set of pipes may be actuated simultaneously, but in the preferred form of construction, I provide each valve 90 and 91 with a handle, whereby it may be operated to an open or closed position or any intermediate position independently of each of the remaining valves, to the end that the supply of smoke to and its exhaust from all portions or different portions of the tunnel may be regulated and controlled.

In carrying out my invention and practicing the process of treating food products, I prefer to adjust the valves 90 to cause the supply of varying quantities of smoke from adjoining inlet pipes 83 and to so adjust the valves 91 in accordance with the adjustments of the valves 90 that zones of varying densities of smoke will be maintained from end to end of the tunnel A. The valves 90, 91, may be adjusted to (1) provided zones of any desired length, to cause a longer or shorter period of treatment in each or (2) zones of different lengths; but in the preferred arrangement or method, I adjust the valves so that each zone will be of a length to accommodate a carrier C or a pair of carriers, so that at each forward movement of a carrier or pair of carriers, they pass from one zone to the adjoining zone. The smoke zone of greatest density is arranged adjoining to the heating zone and the remaining zones decrease in density, as the carriers C move toward the exit or discharge end of the tunnel A. As will be understood from the foregoing description, the smoke to be supplied through the pipes 80, 81, 82 and 83 to the tunnel zones is generated in the furnace or generating apparatus E and forced through these pipes by the fan 70. By connecting the outlet pipes 86, 87, and 88 with the inlet opening of the fan 70, either directly or by connecting the latter pipe to the conduit 69, the fan serves also to exhaust the smoke from the tunnel A. When sufficient smoke has been generated and the circulating system F and smoking zones are fully charged, a valve 92, disposed in the conduit 69, may be closed to cut off the supply of smoke from the furnace E, allowing the smoke in the system F to be used until, by leakage or otherwise, an additional supply is needed. In this event, the valve 92 is opened. When the valve 92 is closed, I open a valve 93, provided in the chimney 94, so that the smoke being generated can escape. When it is found that too much smoke exists in the circulating system F, I may open a valve 95 in a pipe 96, that is connected to the pipe 80.

In carrying out my process, a pair of carriers C loaded with food products, such as hams, is moved up to the position shown in Fig. 2, and the forward trolleys of the carriers are connected to the conveying means, as shown in Fig. 9. The doors 4', 4ᵇ, are opened and then the driving means are operated to move the cables 42 far enough to position the pair of carriers in the heat zone. The doors 4', 4ᵇ, are then closed. The pair of carriers remain stationary in the heat zone for a predetermined period of time to subject the food products to the desired temperature and period of treatment. Next, the driving means are operated to move or convey the pair of carriers into the first smoke zone. The pair of carriers remain therein for a predetermined period of time, at the end of which, the carriers are moved to the next smoke zone where the treatment or curing is continued, such treatment or curing being repeated in each zone until the carriers reach the end of the tunnel and are removed through the exit doors 4', 4ᵇ. It will be understood that before the pair of carriers is moved from the heat zone to the first smoke zone, another pair of carriers is moved into position and attached to the cables 42, so that as the first pair is moved to the first smoke zone, a second pair is moved into the heat zone, this operation being repeated as each pair or pairs of carriers move forward, so that after the tunnel A is once filled, a pair of carriers will be removed from the tunnel and a new pair introduced in each forward movement of the carriers in the tunnel from one zone to another.

From the foregoing description it will be seen that I have provided a smoking apparatus of large capacity and of relatively simple construction. By providing an independent supply of smoke and a heating means that is independent of the smoke supply and furnace for generating the smoke required for curing purposes, I am enabled to regulate each to insure proper curing and smoking, so that the products will be uniform in color and quantity at all times.

In my improved method, the food products are subjected to heat at one zone only, so that relatively little shrinkage takes place.

To those skilled in the art and apparatus to which my invention relates, many modifications in and widely differing embodiments and applications thereof will suggest themselves without departing from the spirit and scope of the invention. My disclosures and the description herein are purely illustrative and are not intended to be in any sense limiting.

What I claim is:—

1. In apparatus of the class described, the combination of a tunnel having closable receiving and discharge openings, means for establishing at one and the same time separate heat and smoke zones in the said tunnel, a carrier for food products adapted to enter and pass through the tunnel, and means for intermittently moving the said carrier through the tunnel where its load is subjected successively to the action of heat and of smoke in the said separate zones.

2. In apparatus of the class described, the combination of a tunnel having closable receiving and discharge openings, means for establishing at one and the same time separate heat and smoke zones in the said tunnel, means for preventing the radiation of heat from the heat zone into the smoke zone, a carrier for food products adapted to enter and pass through the tunnel, and means for intermittently moving the said carrier through the tunnel where its load is subjected successively to the action of heat and of smoke in the said separate zones.

3. In apparatus of the class described, the combination of a tunnel having closable receiving and discharge openings, means for establishing at one and the same time separate heat and smoke zones in the tunnel, suction means connected with the heat zone operating to prevent radiation of the heat from said zone into the smoke zone, a carrier for food products adapted to enter and pass through the tunnel where its load is subjected successively to the action of heat and of smoke in the said separate zones.

4. In apparatus of the class described, the combination of a tunnel having closable receiving and discharge openings, means for dividing the tunnel into successive zones, means for heating an initial zone, connections for delivering smoke into a zone of the tunnel succeeding the heat zone, and means for conveying food products through the tunnel whereby said products are subjected successively to heat and to smoke as they are moved progressively through the tunnel.

5. In apparatus of the class described, the combination of a tunnel having receiving and discharge openings and doors for closing said openings, means for establishing a heat zone in said tunnel, means for producing smoke, and connections between said smoke producing means and said tunnel for supplying smoke to the latter, said connections including a main conduit having a plurality of branch pipes leading to said tunnel at uniformly spaced points.

6. In apparatus of the class described, the combination of a tunnel having receiving and discharge openings and doors for closing said openings, separate means for establishing a heat zone in said tunnel, means for producing smoke, connections between said smoke producing means and said tunnel for supplying smoke to the latter, said connections including a main conduit having a plurality of branch pipes leading to said tunnel at uniformly spaced points, and means for regulating the supply of smoke through each of said branch pipes.

7. In apparatus of the class described, the combination of a tunnel having receiving and discharge openings and doors for closing said openings, means for establishing a heat zone in said tunnel, a circulation system for smoke including a plurality of smoke supply and exhaust pipes connected to said tunnel and means for causing a flow of the smoke therethrough, and means for supplying smoke to said system.

8. In apparatus of the class described, the combination of a tunnel having receiving and discharge openings and doors for closing said openings, means for establishing a heat zone in said tunnel, a circulation system for smoke including a plurality of smoke supply and exhaust pipes connected to said tunnel in alternate arrangement substantially from end to end thereof and means for causing a flow of the smoke therethrough, and means for supplying smoke to said system.

9. In apparatus of the class described, the combination of a tunnel having receiving and discharge openings and doors for closing said openings, means for establishing a heat zone in said tunnel, a circulation system for smoke including a plurality of smoke supply and exhaust pipes connected to said tunnel, means for causing a flow of the smoke therethrough, means for supplying smoke to said system, and means for regulating the flow of smoke through each of said supply and exhaust pipes.

10. In apparatus of the class described, the combination of a tunnel having receiving and discharge openings and doors for closing said openings, means for establishing a heat zone adjacent the receiving opening of said tunnel, means for establishing zones of varying smoke densities in said tunnel between said heat zone and the discharge opening thereof, and means for moving carriers of food products through said heat and smoke zones.

11. In apparatus of the class described, the combination of a tunnel having receiving and discharge openings and doors for closing said openings, means for establishing a heat zone adjacent the receiving opening of said tunnel, means for establishing zones of varying smoke densities in said tunnel between said heat zone and the discharge opening thereof, and means for intermittently moving carriers of food products through said tunnel, whereby they are maintained in said zones a predetermined period of time.

12. In apparatus of the class described, the combination of a tunnel having receiving and discharge openings and doors for closing said openings, means for establishing a heat zone adjacent the receiving opening of said tunnel, means for establishing zones of varying smoke densities in said tunnel between said heat zone and the discharge opening thereof, the zone of greatest density being adjacent said heat zone and varying toward the said discharge opening, and means for moving carriers of food products through said heat and smoke zones.

13. In apparatus of the class described, the combination, of a tunnel having receiving and discharge openings and doors for closing said openings, means for establishing a heat zone adjacent the receiving opening of said tunnel, a circulation system for smoke having a main supply pipe, a return pipe and a plurality of inlet and exhaust pipes connected to said main supply and return pipes, respectively, said inlet and exhaust pipes leading into said tunnel in alternate arrangement, a valve in each of said inlet and exhaust pipes for controlling the flow of smoke therethrough, whereby zones of varying smoke densities may be established in said tunnel, and means for moving carriers of food products through said tunnel.

14. In apparatus of the class described, the combination, of a tunnel having receiving and discharge openings and doors for closing said openings, means for establishing a heat zone adjacent the receiving opening of said tunnel, a circulation system for smoke having a main supply pipe, a return pipe and a plurality of inlet and exhaust pipes connected to said main supply and return pipes, respectively, said inlet and exhaust pipes leading into said tunnel in alternate arrangement, the free ends of said exhaust pipes being arranged below the free ends of said inlet pipes, a valve in each of said inlet and exhaust pipes for controlling the flow of smoke therethrough, whereby zones of varying smoke densities may be established in said tunnel, and means for moving carriers of food products through said tunnel.

15. In apparatus of the class described, the combination, of a tunnel having receiving and discharge openings and doors for closing said openings, means for establishing a heat zone adjacent the receiving opening of said tunnel, a circulation system for smoke having a main supply pipe and a return pipe and a plurality of inlet and exhaust pipes connected to said main supply and return pipes, respectively, said inlet and exhaust pipes leading into said tunnel in alternate arrangement, a valve in each of said inlet and exhaust pipes for controlling the flow of smoke therethrough, whereby zones of varying smoke densities may be established in said tunnel, means for moving carriers of food products through said tunnel, and valve controlled means for supplying smoke to said circulation system.

16. In apparatus of the class described, the combination, of a tunnel having receiving and discharge openings and means for closing said openings, a circulation system for smoke having a plurality of inlet pipes and a plurality of exhaust pipes having their free ends disposed in said tunnel in the central longitudinal plane thereof and alternately arranged to supply smoke to said tunnel and exhaust it therefrom, means in said system for causing a flow of the smoke through said pipes, and means for moving carriers through said tunnel at either side of the free ends of said inlet and exhaust pipes.

17. In apparatus of the class described, the combination of a tunnel having receiving and discharge openings and means for closing said openings, a circulation system for smoke having a plurality of inlet pipes and a plurality of exhaust pipes having their free ends disposed in said tunnel in the central longitudinal plane thereof and alternately arranged to supply smoke to said tunnel and exhaust it therefrom, the free ends of said exhaust pipes being arranged in a plane below the free ends of said inlet pipes, means for establishing a heat zone adjacent the receiving opening of said tunnel, means in said system for causing a flow of the smoke through said pipes, and means for moving carriers through said tunnel at either side of the free ends of said inlet and exhaust pipes.

18. In apparatus of the class described, the combination of a tunnel having receiving and discharge openings and means for closing said openings, means for establishing a heat zone adjacent the receiving opening of said tunnel, a circulation system for smoke having a plurality of inlet pipes and a plurality of exhaust pipes having their free ends disposed in said tunnel in the central longitudinal plane thereof and alternately arranged to supply smoke to said tunnel and exhaust it therefrom, means in said system for causing a flow of the smoke through said pipes, a valve in each of said inlet and exhaust pipes for controlling the flow of smoke therethrough, whereby zones of varying smoke densities may be provided between said heat zone and the discharge opening of said tunnel, and means for moving carriers through said tunnel at either side of the free ends of said inlet and exhaust pipes.

19. The herein disclosed process which consists in subjecting food products to heat and then passing the products through a plurality of zones filled with different densities of smoke.

20. The herein disclosed process which consists in subjecting food products to heat, then passing them through a zone of smoke and finally passing the products through a separate zone of smoke of less density than the first smoke zone.

21. The herein disclosed process which consists in establishing in a closed chamber a heat zone and a plurality of smoke zones in which the density of the smoke decreases from one to the other toward the discharge end of said chamber, and in moving a batch of food products through said chamber and holding it in each of said zones for a predetermined period of time.

22. The herein disclosed process which consists in establishing in a closed chamber a heat zone and a non-heated zone filled with smoke, then subjecting a batch of food products to the heat in said heat zone for a predetermined period of time and finally in moving the products into the smoke zone and holding them therein for a predetermined period of time.

23. In apparatus of the class described, the combination of a tunnel having receiving and discharge openings, means for establishing a heat zone in said tunnel, means for establishing a plurality of smoke zones of varying densities in said tunnel, and means for conveying products to be treated through said tunnel, whereby they are subjected successively to heat and varying densities of smoke.

24. In apparatus of the class described, the combination of a tunnel having receiving and discharge openings, means for establishing a heat zone in said tunnel, means for establishing a plurality of smoke zones of varying densities in said tunnel, and means for intermittently conveying products to be treated through said tunnel, whereby they are subjected successively to heat and varying densities of smoke.

In testimony whereof, I have hereunto subscribed my name.

HARRY M. ROBERTSON.